(12) United States Patent
Smook et al.

(10) Patent No.: US 7,614,976 B2
(45) Date of Patent: Nov. 10, 2009

(54) GEARBOX FOR A WIND TURBINE

(75) Inventors: Warren Smook, Gauteng (ZA); Roger Bogaert, Dendermonde (BE)

(73) Assignee: Hansen Transmissions International, naamloze vennootschap, Edegem (BE)

( * ) Notice: Subject to any disclaimer, the term of this patent is extended or adjusted under 35 U.S.C. 154(b) by 424 days.

(21) Appl. No.: 11/601,751

(22) Filed: Nov. 20, 2006

(65) Prior Publication Data
US 2007/0142156 A1   Jun. 21, 2007

(30) Foreign Application Priority Data
Nov. 21, 2005   (BE) .................................. 2005/0565

(51) Int. Cl.
*F16H 57/08* (2006.01)
(52) U.S. Cl. ........................................ 475/331; 74/410
(58) Field of Classification Search ................ 475/331, 475/346, 317; 416/170 R; 384/495, 447
See application file for complete search history.

(56) References Cited

U.S. PATENT DOCUMENTS

| 2,603,983 | A |   | 7/1952 | Rieser |   |
|---|---|---|---|---|---|
| 3,583,252 | A | * | 6/1971 | Shipitalo et al. | ............... 74/399 |
| 4,095,323 | A | * | 6/1978 | Silvestri | .................... 29/893.1 |
| 4,944,195 | A | * | 7/1990 | Takahashi et al. | ............. 74/409 |
| 5,240,462 | A | * | 8/1993 | Mochizuki et al. | ........... 475/342 |
| 6,585,620 | B1 | * | 7/2003 | Bae | ............................ 475/331 |
| 6,945,901 | B2 | * | 9/2005 | Flamang | ...................... 475/331 |
| 7,011,598 | B2 | * | 3/2006 | Flamang et al. | ............. 475/331 |
| 7,090,465 | B2 | * | 8/2006 | Flamang et al. | ......... 416/170 R |
| 2003/0123984 | A1 | * | 7/2003 | Wilde et al. | ............. 416/170 R |
| 2004/0213671 | A1 | * | 10/2004 | Flamang | ................. 416/170 R |
| 2004/0247437 | A1 | * | 12/2004 | Otaki et al. | ............. 416/132 B |
| 2006/0148612 | A1 | * | 7/2006 | Albers et al. | ................ 475/331 |
| 2008/0118344 | A1 | * | 5/2008 | Matsumori et al. | ........... 415/45 |

FOREIGN PATENT DOCUMENTS

| DE | 103 18 945 | 10/2004 |
|---|---|---|
| EP | 0 097 963 | 1/1984 |
| EP | 0 635 639 | 1/1995 |
| EP | 1 046 838 | 10/2000 |

* cited by examiner

*Primary Examiner*—David D Le
*Assistant Examiner*—Justin Holmes
(74) *Attorney, Agent, or Firm*—Young & Thompson

(57) ABSTRACT

A gearbox for a wind turbine which consists of a housing and a gear wheel transmission with an ingoing shaft having at least one driving gear wheel which is or can be connected to the rotor of the wind turbine, characterized in that, in the unloaded condition of the gearbox, the axis of symmetry of the seating or seatings of the bearing of the ingoing shaft in the housing does not coincide with the geometrical axis of symmetry of the gear wheel transmission, as a result of which there will be a certain deviation between the abovementioned axes of symmetry in the unloaded condition which is such that, in a static, loaded condition, in other words under the weight of the rotor, the alignment error which is caused by the weight of the rotor is at least partially compensated.

14 Claims, 6 Drawing Sheets

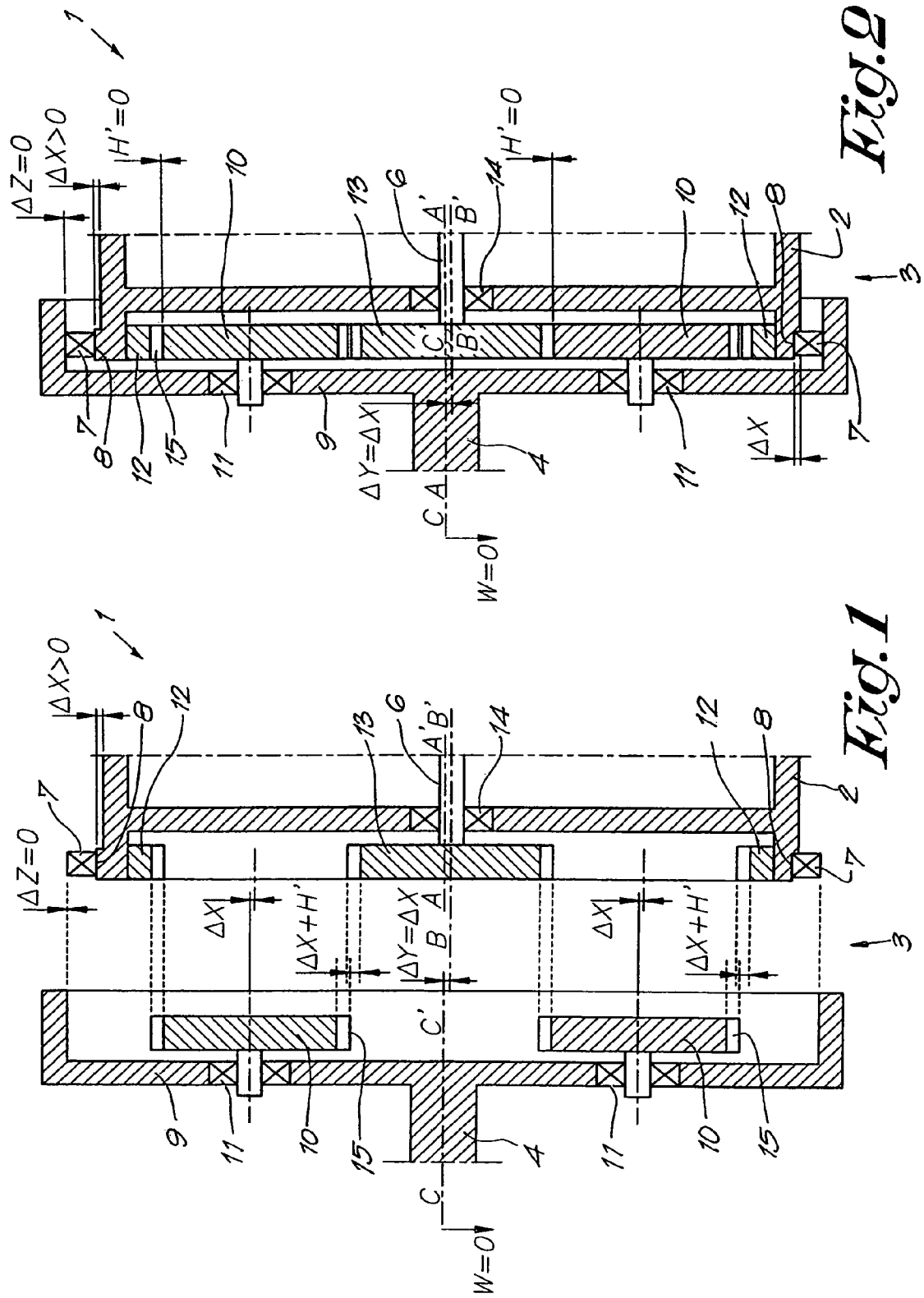

Figure 6:
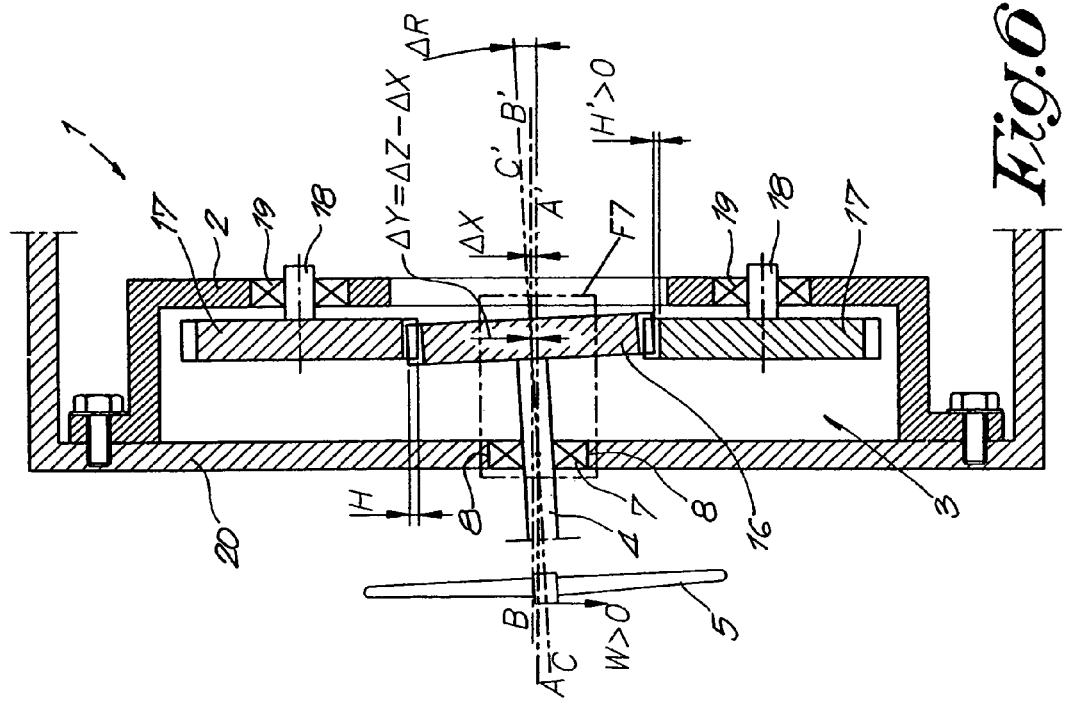

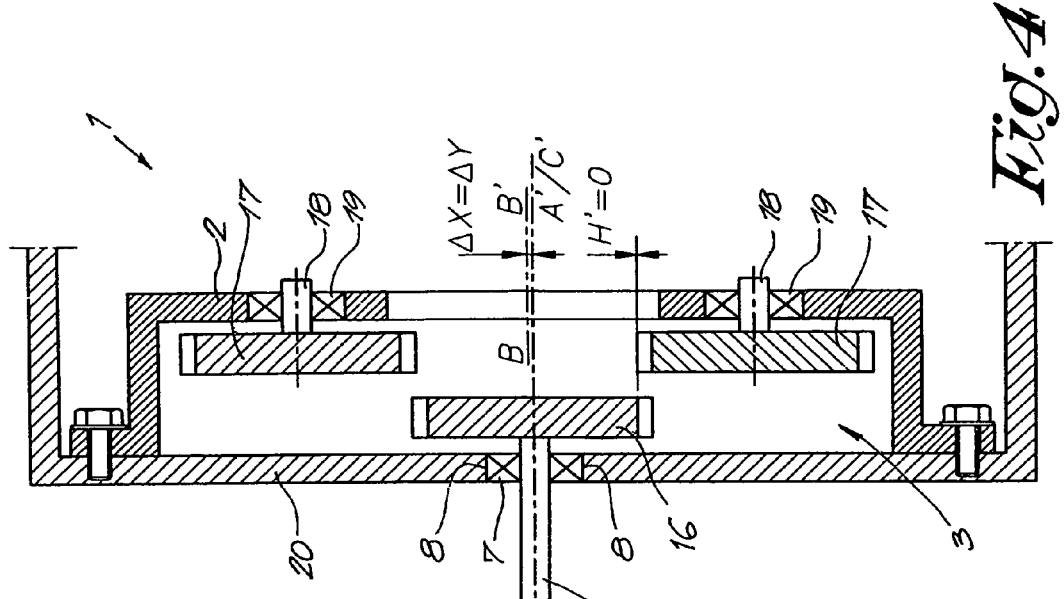
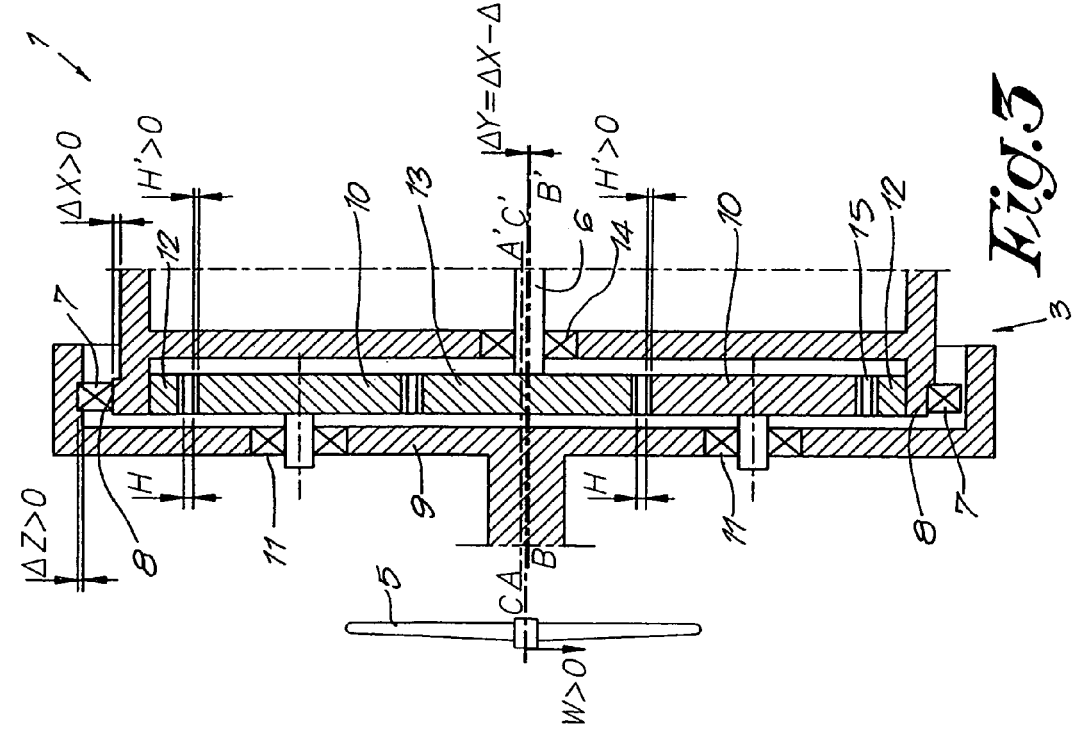

GEARBOX FOR A WIND TURBINE

The present invention concerns a gearbox for a wind turbine.

In particular, the present invention concerns a gearbox for a wind turbine which consists of a housing and a gear wheel transmission with an ingoing shaft having at least one driving wheel in the form of a gear wheel or in the form of a planet carrier of a planetary gear unit which is or can be connected to the rotor of the wind turbine, whereby, in particular, for the good working of the above-mentioned gear wheel transmission, the axis of symmetry of the ingoing shaft normally coincides with or is aligned with the geometrical axis of symmetry of the gear wheel transmission.

By the geometrical axis of symmetry is meant the axis of symmetry of the whole of gear wheels which are directly or indirectly driven by the driving wheel and which are formed for example of a number of gear wheels provided in a symmetrical manner around the driven gear wheel or of parts of a planetary gear unit working in conjunction with the driving gear wheel.

In the known gear wheel transmissions for wind turbines, the axis of symmetry of the bearing seatings of the ingoing shaft practically coincides with the above-mentioned geometrical axis of symmetry of the gear wheel transmission in the unloaded condition, but for alignment errors within tolerance limits.

A major factor is not taken into account here, namely the load on the ingoing shaft produced by the rotor of the wind turbine.

In the current wind turbines with rotor blades of about ten meters or more, said load is very large and it consists of a static component, resulting from the rotor weight, and a dynamic component, resulting from a varying and possibly asymmetrical wind load.

Due to the plays in the bearings of the ingoing shaft, or due to elastic deformations under the influence of the rotor load in said bearings or in the housing supporting said bearings, the alignment of the ingoing shaft, after it has been loaded by the rotor, will deviate considerably from the geometrical axis of symmetry of the gear wheel transmission.

In short, in the known gearboxes, the perfect alignment of the ingoing shaft and the geometrical axis of symmetry of the gear wheel transmission, when the seating of the bearings is unloaded, leads to an alignment error when the ingoing shaft is loaded by the rotor.

A consequence of the above-mentioned alignment error is that the plays between the flanks of the teeth of the gear wheels can become too restricted in some cases, for example simply due to the rotor weight or due to a combination of the static rotor weight with an extreme dynamic load, or they may be completely lacking or, on the contrary, increase.

A disadvantage of all this is the lack of a tooth flank play and the fact that an irregular load of the gear wheels is obtained and the normal interplay of forces between the gear wheels is disturbed.

Further, it is known that in conventional designs of wind turbines, the rotor shaft and the ingoing shaft of the gear wheel transmission are each bearing-mounted separately, i.e. the rotor shaft in relation to the housing of the wind turbine and the ingoing shaft in relation to the housing of the gearbox, whereby the latter is itself connected to the housing of the wind turbine via a spring/damper system.

Such a conventional design is advantageous in that the housing of the gearbox follows the movement of the rotor shaft rather well, via the bearing on the ingoing shaft, apart from the plays and deformations in the bearings and the deformation of the housing of the gearbox as a result of the reactive forces which are transmitted to the housing of the wind turbine.

As a consequence, the ingoing shaft and the housing of the gearbox stay relatively well aligned in relation to each other.

As is also known, much attention is paid to weight reduction in the current designs of wind turbines, whereby the above-mentioned bearing of the ingoing shaft in the gear wheel box is often eliminated and the function of this bearing of the ingoing shaft is assumed by the rotor bearings, or better still by one large, integrated main bearing which is capable of absorbing radial as well as axial loads and thus also moments.

By eliminating the direct bearing of the ingoing shaft in the gearbox, the relative position of the housing of the gearbox in relation to the ingoing shaft is no longer determined by the ingoing shaft, but by the sum of all elastic deformations as a result of the rotor load in the housing of the gearbox, in the interface between the housing of the gearbox and the housing of the wind turbine, in the housing of the wind turbine itself and in the main bearing, as well as by the displacement of the ingoing shaft, such that the relative displacement between the ingoing shaft and the housing of the gearbox under the rotor load is larger and such that the above-mentioned alignment error in the loaded condition and the disadvantageous effects thereof on the gear wheels are larger as well in these recent designs of wind turbines.

This could be prevented, for example, by making the construction more rigid, which is again disadvantageous to the obtained weight reduction.

In other words, the alignment deviation of the ingoing shaft in the loaded condition prevents a further weight reduction of the wind turbines.

The present invention aims to remedy one or several of the above-mentioned and other disadvantages.

To this end, the present invention concerns a gearbox for a wind turbine of the above-mentioned type whereby, when the gearbox is unloaded, i.e. before the rotor is mounted on the ingoing shaft, the axis of symmetry of the seating or seatings of the bearing of the ingoing shaft in the housing does not coincide with the geometrical axis of symmetry of the gear wheel transmission, and thus there will be a certain deviation between the above-mentioned axes of symmetry which is such that, in a static, loaded condition, in other words under the weight of the rotor, the alignment error which is caused by the weight of the rotor is at least partly compensated.

An advantage of such a gearbox according to the invention is that the alignment error which is caused by the weight of the rotor can be at least partly compensated in a relatively simple manner, as a result of which a complete elimination of the play between the flanks of the gear wheels, as well as an irregular load of the gear wheels resulting from insufficient plays can be avoided, such that the normal interplay of forces between the gear wheels is not disturbed.

According to a preferred embodiment of a gearbox according to the invention, the above-mentioned deviation in the unloaded condition is such that, in a static, loaded condition, in other words under the weight of the rotor, the axis of symmetry of the ingoing shaft mainly coincides with the geometrical axis of symmetry of the gear wheel transmission, and thus the alignment error between the above-mentioned axes of symmetry in the static, loaded condition will be zero or practically zero.

An advantage of this embodiment of a gearbox according to the invention is that the alignment error in the loaded condition is maximally reduced, since the static load of the rotor weight is the only predictable component of the load which moreover always works in the same direction, as opposed to the dynamic load under the influence of a varying wind load, which has a rather stochastic nature, and which can moreover contribute in a positive as well as a negative manner to the alignment error in the loaded condition.

Figure 5:
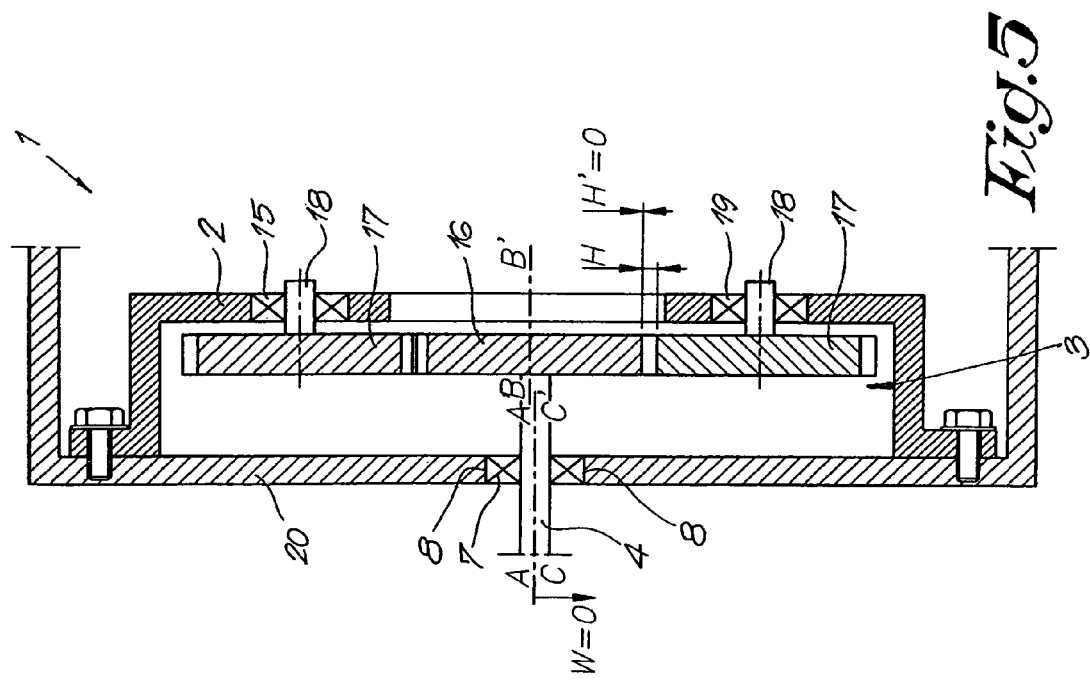
Figure 7:
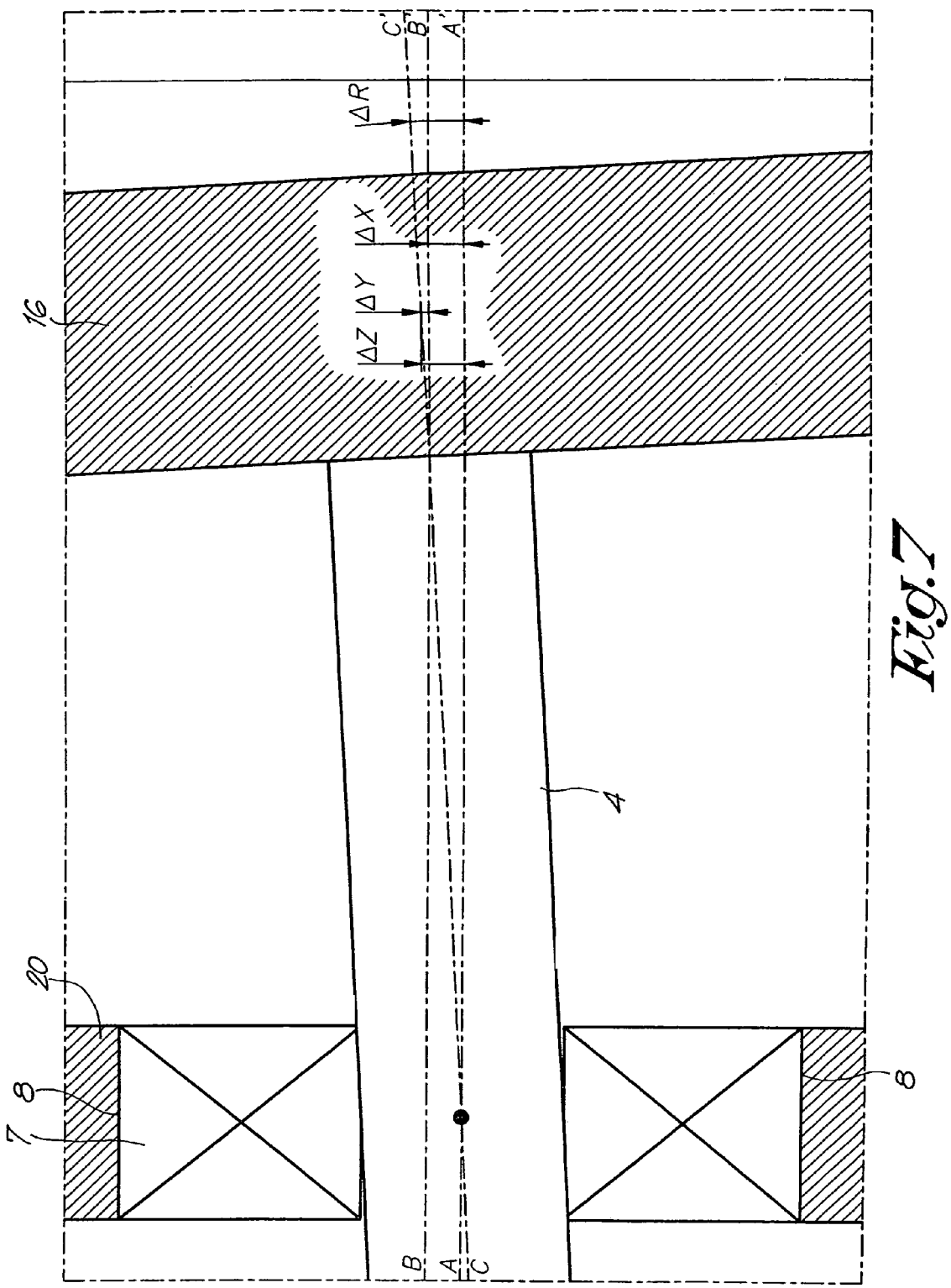
Figure 8:
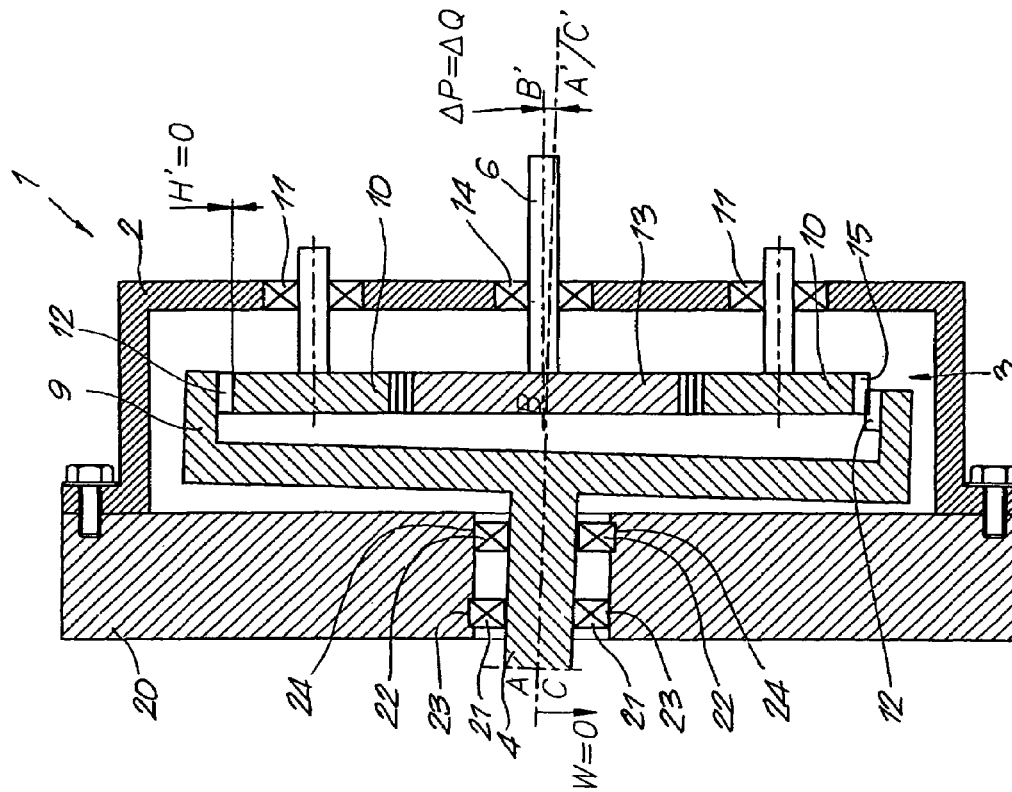
Figure 9:
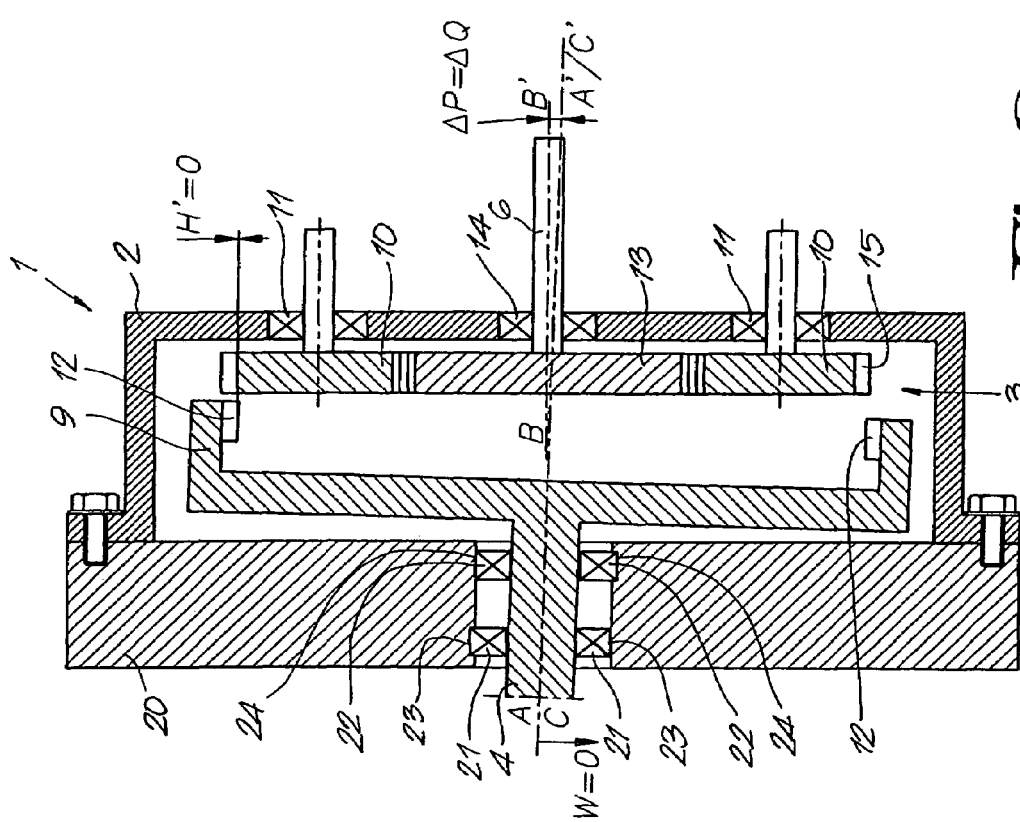
Figure 10:
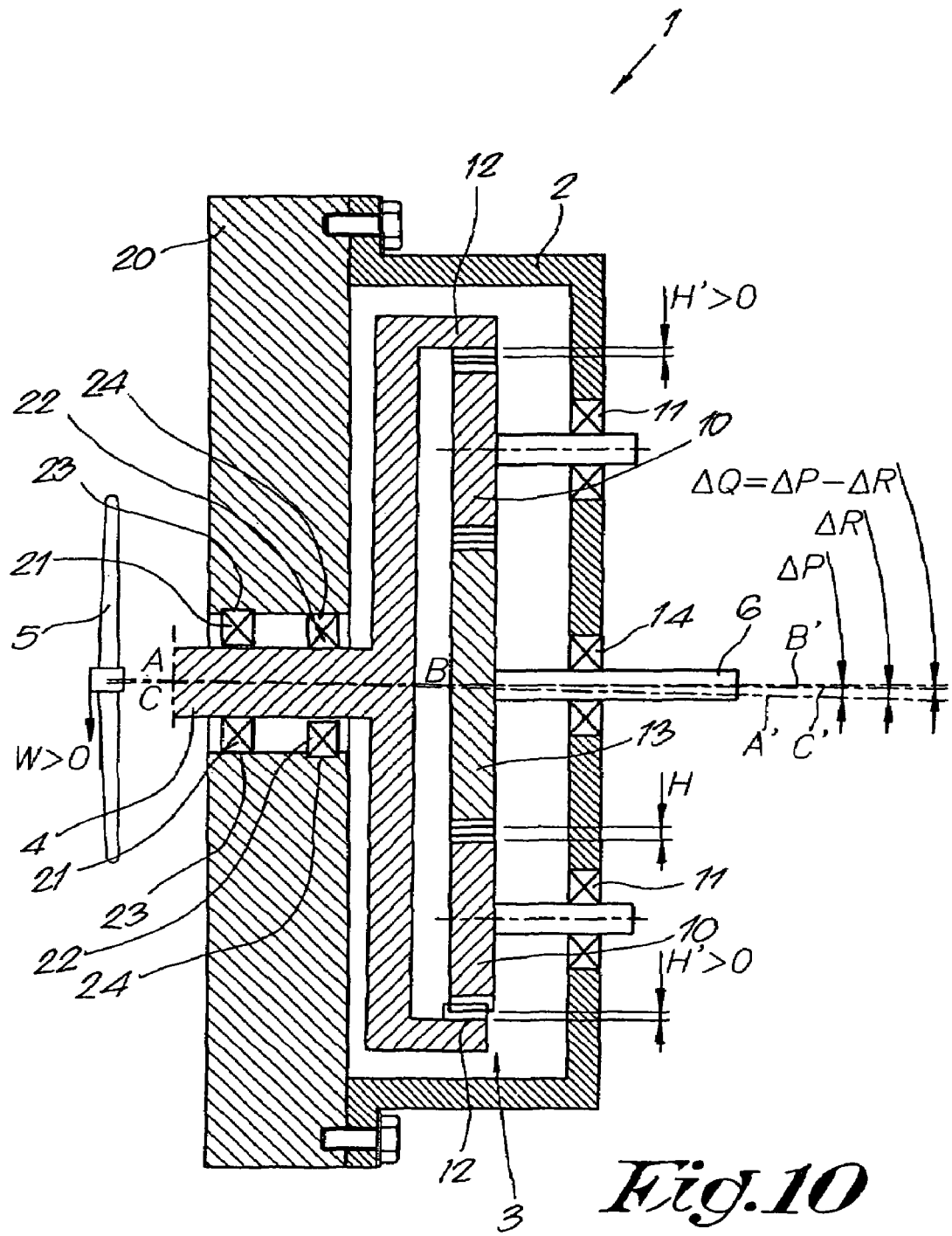

In order to better explain the characteristics of the invention, the following preferred embodiments of a gearbox for a wind turbine according to the invention are given as an example only without being limitative in any way, with reference to the accompanying figures, in which:

FIGS. 1 to 3 schematically represent a gearbox according to the invention seen as a section, in the unloaded disassembled condition, in the unloaded assembled condition and in the loaded assembled condition respectively;

FIGS. 4 to 6, analogous to FIGS. 1 to 3, represent another embodiment of a gearbox according to the invention;

FIG. 7 represents the part indicated by F7 in FIG. 6 to a larger scale; and FIGS. 8 to 10, analogous to FIGS. 1 to 3, represent another embodiment of a gearbox according to the invention, in an unloaded and loaded condition respectively.

It is clear that these figures strongly simplify reality and that they are only meant to clearly illustrate the principle of the invention.

These simplifications consist for example in initially giving a rough representation of the actual deformations and displacements occurring in a wind turbine under the influence of a rotor load by means of for example a translation in a certain direction or a rotation round a point of a specific shaft of the gearbox, whereby, for clarity's sake, these displacements are moreover exaggeratedly enlarged.

Of course, in reality, the above-mentioned deformations and displacements are much more complex.

The above-mentioned shaft can for example bend somewhat under the influence of the rotor load, such that the different points of the shaft are separately subjected to a combination of a displacement and a rotation in relation to their position when unloaded.

By applying the same principle as explained hereafter for the simplified examples, however, it is also possible according to the invention to obtain a better alignment for the more complicated deformations and displacements that occur in reality.

FIGS. 1 and 2 represent an unloaded gearbox 1 to be mounted in a wind turbine which mainly consists of a housing 2 and a gear wheel transmission in the form of a planetary gear unit 3, with an ingoing shaft 4 serving as the driving shaft on which the rotor 5 of the wind turbine can be mounted, as is schematically represented in FIG. 3, and a driven shaft 6, for example to drive an electricity generator which is not represented for the sake of simplicity.

The ingoing shaft 4, as well as the rotor 5 are supported by a common main bearing 7 which is provided with its inner bearing ring in a seating 8 of the housing 2, whereby this main bearing 7 can absorb axial as well as radial loads and moments of course.

The planetary gear unit 3 in this case consists of a driving wheel in the form of a planet carrier 9 on the above-mentioned ingoing shaft 4; planet wheels 10 which can rotate via bearings 11 on the planet carrier 9 and which serve as driving gear wheels; a planetary gear 12 which is fixed to the housing 2 and a sun gear 13 which is provided such in the housing 2 that it can rotate on the above-mentioned driven shaft 6 by means of bearings 14, whereby the planet wheels 10 work in conjunction with the planetary gear 12 and the sun gear 13.

The gearbox 1 is made such according to the invention that the axis of symmetry AA' of the seating 8 of the bearing 7 of the ingoing shaft 4, when unloaded, does not coincide with the geometrical axis of symmetry BB' of the gear wheel transmission 3, which in this case is formed of the geometrical axis of symmetry BB' of the planetary gear 12 and the sun gear 13 working in conjunction with the planet wheels 10.

As a result, there is a certain deviation $\Delta X$ between the above-mentioned axes of symmetry AA' and BB', whereby both axes of symmetry AA' and BB' have shifted in relation to each other in the cross direction over a distance $\Delta X$, or, to be more precisely, the seating of the main bearing 7 has been provided such in the housing 2 that, in an unloaded condition, it is eccentric in relation to the geometrical axis of symmetry BB' of the gear wheel transmission 3, as becomes clear from FIG. 1.

In the given example, the axis of symmetry AA' is shifted upward over a distance $\Delta X$ in relation to the axis of symmetry BB'.

Of course, as a result of this, in said unloaded condition, as is clearly represented in FIGS. 1 and 2, there is also an alignment error $\Delta Y$ between the axis of symmetry CC' of the ingoing shaft 4 and the geometrical axis of symmetry BB' of the gear wheel transmission 3.

As is schematically represented in FIG. 3, however, as a result of the play in the main bearing 7 and/or the elastic deformation of this main bearing 7 or the supporting housing 2, under the weight W of the rotor 5, the ingoing shaft 4 and thus the planet carrier 9 with the planet wheels 10 will move down over a distance $\Delta Z$ in relation to the housing 2.

Of course, as already mentioned before, in reality it is possible that the ingoing shaft 4 is subjected to a certain angular displacement or deflection as well.

For clarity's sake and in order to clearly illustrate the principle of the invention, we initially assume here that the play in the main bearing 7 and the above-mentioned deformations of the main bearing 7 or the housing 2 under the rotor weight W only result in a displacement $\Delta Z$ in the vertical direction and that for example the plays and elastic deformations in the bearings 11, as well as the deformations in the planet carrier 9 and in the housing 2 between the planetary gear 12 and the sun gear 13 are negligible compared to the above-mentioned displacement $\Delta Z$.

As a result of the downward displacement $\Delta Z$, the alignment error $\Delta Y$ between the axis of symmetry CC' of the ingoing shaft 5 and the geometrical axis of symmetry BB' of the gear wheel transmission 3 will be reduced, so that both axes of symmetry BB' and CC' in the static, loaded condition of FIG. 3 are thus better aligned than in the case of the known gearboxes for wind turbines, whereby the alignment error $\Delta Y$ is ideally reduced to zero, as a result of which the axes of symmetry CC' and BB' will be perfectly aligned in the static, loaded condition.

This makes sure that in the static, loaded condition, the teeth 15 of the different gear wheels 10, 12 and 13 mesh over a height H of the teeth 15, whereby a normal play H' is maintained between the flanks of the teeth 15, such that the normal interplay of forces between the different gear wheels is not disturbed.

The dynamic component of the rotor load, for example under a varying or asymmetrical wind load, is not taken into account when determining the deviation $\Delta X$, since this dynamic component is unpredictable and causes deformations which might contribute in a positive as well as a negative manner to the above-mentioned downward displacement $\Delta Z$.

However, this dynamic component is typically an order of magnitude smaller than the static component, such that this component is not a real problem as such, but may possibly cause problems in combination with the static component, if no compensations are made, as suggested by the present invention.

The invention is advantageous in that, even when taking into account the dynamic component of the rotor load, the alignment error ΔY is much smaller than with the known wind turbines.

In another embodiment of a gearbox 1 according to the invention, represented in FIGS. 4 to 7, the gear wheel transmission 3 is no planetary gear unit but a driving gear wheel 16 provided directly on an ingoing shaft 4 and which works in conjunction with a set of driven gear wheels 17 erected symmetrically round the driving gear wheel 16 on shafts 18 which are bearing mounted in the housing 2 of the gearbox 1 by means of bearings 19, and which serve as driven shafts 18, for example to drive several generators.

The ingoing shaft 4 is further bearing-mounted in the housing 20 of the wind turbine by means of an integrated main bearing 7, whereby the outer bearing ring of the main bearing 7 is in this case provided in a seating 8 of the housing 20 of the wind turbine.

The gearbox 1 is again made such according to the invention that the axis of symmetry AA' of the seating 8 of the bearing ring 7 of the ingoing shaft 5 in the housing 20, when unloaded, does not coincide with the geometrical axis of symmetry BB' of the gear wheel transmission 3, which in this case is the axis BB' which is situated centrally in relation to the shafts 18 of the driven gear wheels 17, such that there is again a certain deviation ΔX between the above-mentioned axes of symmetry AA' and BB', whereby both axes of symmetry AA' and BB', as in the preceding example, are shifted in relation to each other in the cross direction over a distance ΔX.

In the given example, this is realized however by providing the housing 2 of the gearbox 1 in such a manner on the housing 20 of the wind turbine that the geometrical axis of symmetry BB' of the gear wheel transmission 3, when unloaded, is eccentric in relation to the axis of symmetry AA' of the seating 8 of the main bearing 7, whereby moreover the axis of symmetry BB' is this time shifted up over a distance ΔX in relation to the axis of symmetry AA'.

Naturally, in this unloaded condition, as is represented in FIGS. 4 and 5, this will again result in an alignment error ΔY between the axis of symmetry CC' of the ingoing shaft 5 and the geometrical axis of symmetry BB' of the gear wheel transmission 3.

In order to clearly illustrate the principle of the invention, it is assumed that under the influence of the weight W of the rotor 6, as is represented in FIGS. 6 and 7, in this case the ingoing shaft 5 will initially rotate at a certain angle ΔR as a result of plays in the main bearing 7 or of deformations of this main bearing 7 or the supporting housing 20.

Said rotation ΔR initially results, for small angles at the driving gear wheel 15, in an upward displacement ΔZ in the vertical direction.

For clarity's sake, all sorts of other possible deformations and displacements which might have an influence on the above-mentioned upward displacement ΔZ, such as for example a downward displacement analogous to the preceding example, are assumed to be negligible.

It is clear that, by placing the axis of symmetry AA' of the seating 8 of the main bearing 7 eccentrically in relation to the axis of symmetry BB' of the gear wheel transmission 3, a smaller alignment error ΔY is again obtained between the ingoing shaft 5 and the axis of symmetry BB' in the loaded condition, or in other words a better alignment in the loaded condition than with the known gearboxes, at least at the driving gear wheel 16.

An additional improvement according to the invention may consist in compensating the small remaining angular divergence ΔR which is present in this example between the driving gear wheel 15 and the driven gear wheels 17 and which is exaggeratedly enlarged in FIGS. 6 and 7 for clarity's sake, by adjusting the microgeometry of the gear wheels.

Naturally, as in the preceding example, the arranged deviation or eccentricity ΔX is preferably equal to, or practically equal to the upward displacement ΔZ, such that the alignment error ΔY in the static, loaded condition is zero or practically zero.

In yet another embodiment, represented in FIGS. 8 to 10, the gear wheel transmission 3 as in FIGS. 1 to 3 is again a planetary gear unit, whereby a driving planetary gear 12 is now fixed to an ingoing shaft 4 however, which drives a driven shaft 6 via identical planet wheels 10 and a sun gear 13, whereby the planet wheels 10 and the sun gear 13 are bearing-mounted in the housing 2 of the gearbox 1 by means of bearings 11 and 14 respectively which are provide in the housing in a fixed manner.

In other words, the housing 2 of the gearbox 1 assumes the function of planet carrier 9 of the planetary gear unit.

Further, the ingoing shaft 4 is in this case bearing-mounted in the housing 20 of the wind turbine by means of two bearings 21 and 22, whereby these bearings 21 and 22 are capable of receiving a radial as well as an axial load, whereby the outer bearing rings of these bearings 21 and 22 are provided in seatings 23 and 24 respectively of the housing 20 of the wind turbine.

The gearbox 1 is made such according to the invention that the axis of symmetry AA' of the seatings 23 and 24 of the bearings 21 and 22 of the ingoing shaft 4, when unloaded, does not coincide with the geometrical axis of symmetry BB' of the gear wheel transmission 3, which in this case is the axis of symmetry BB' of the outgoing shaft 6, as a result of which there is again a certain deviation ΔP between the above-mentioned axes of symmetry AA' and BB', which in this case consists of an angular displacement ΔP of both axes of symmetry AA' and BB' in relation to each other.

In the given example, this is obtained by aligning the seatings 23 and 24 in such a manner that they rotate at the above-mentioned angle ΔP in relation to the axis of symmetry BB' of the gear wheel transmission 3.

Naturally, in the unloaded condition, as represented in FIGS. 8 and 9, there will again be an alignment error ΔQ in the form of an angular displacement ΔQ between the axis of symmetry CC' of the ingoing shaft 4 and the axis of symmetry BB' of the gear wheel transmission 3.

For the sake of simplicity, it is again assumed, as in the preceding example, that under the weight W of the rotor 5, as is represented in FIG. 10, the ingoing shaft 4 is initially subjected to an angular displacement ΔR, such that the above-mentioned alignment error ΔQ is reduced again in the static, loaded condition, whereby in order to obtain a minimal alignment error ΔQ, the arranged deviation in the form of an angular displacement ΔP between the seatings 23 and 24 and the axis of symmetry BB' is preferably equal to the angular displacement ΔR that the ingoing shaft 4 is subjected to under the weight W.

It is clear that, according to the invention, there are many possible alternatives to the above-described examples.

Thus, it is perfectly possible to provide a deviation by way of compensation in the unloaded condition that is a combination of a shift ΔX, as in the examples of FIGS. 1 to 5, and a rotation ΔP, as in the example of FIGS. 6 and 7, such that a minimal alignment error is obtained under a static load W.

It is also clear that in the examples shown, only a limited number of factors have been taken into account for clarity's sake, such as the play in the vertical direction in the main bearing 7, etc., whereas in practice it is possible to take into account all sorts of displacements between the axis of symmetry AA' of the ingoing shaft 4 and the axis of symmetry BB' of the gear wheel transmission 3 under the weight W of the rotor 5, such as for example displacements resulting from the deformation of the housing 2 of the gearbox 1 or from plays in other bearings of the gearbox 1.

Further, it is also clear that the deflection of the different shafts was not taken into account in the examples, which does not alter the fact that, by applying the principle of the invention, the alignment error between the ingoing shaft 4 and the axis of symmetry BB' of the gear wheel transmission 3 in the static, loaded condition can be restricted, also when taking into account such deflections or the like.

It is also clear that the present invention can be applied to wind turbines having a small load as used in buildings or small firms, as well to industrial applications with turbines of several Megawatts.

The invention is by no means restricted to the embodiments given as an example and represented in the figures; on the contrary, such a gearbox for a wind turbine can be made in different shapes and dimensions while still remaining within the frame of the invention.

The invention claimed is:

1. A gearbox (1) for a wind turbine, comprising:
a housing (2); and
a gear wheel transmission (3) with an ingoing shaft (4) having at least one driving wheel (9,16,12) connectable to a rotor (5) of the wind turbine, wherein,
in an unloaded condition (W=0) of the gearbox (1), an axis of symmetry (AA') of a seating (8) of a bearing (7, 21, 22) of the ingoing shaft (4) in the housing (2,20) does not coincide with a geometrical axis of symmetry (BB') of the gear wheel transmission (3), as a result of which there will be a deviation (ΔX, ΔP) between the above-mentioned axes of symmetry (AA',BB') in the unloaded condition which is such that, in a static, loaded condition, under a weight (W) of the rotor (5), providing compensation for an alignment error caused by the weight (W) of the rotor (5).

2. A gearbox according to claim 1, characterized in that the abovementioned deviation in the unloaded condition consists of a shift (ΔX) in the cross direction of the abovementioned axes of symmetry (AA',BB') in relation to each other.

3. A gearbox according to claim 1, characterized in that the abovementioned deviation in the unloaded condition consists of a rotation (ΔR) of the above mentioned axes of symmetry (AA',BB') in relation to each other.

4. A gearbox according to claim 1, characterized in that the abovementioned deviation in the unloaded condition consists of a combination of a shift (ΔX) in the cross direction of the abovementioned axes of symmetry (AA',BB') in relation to each other and a rotation (ΔP) of the abovementioned axes of symmetry (AA',BB') in relation to each other.

5. A gearbox according to claim 1, characterized in that the deviation (ΔX, ΔP) in the unloaded condition (W=0) is such that, in the static, loaded condition under the weight (W) of the rotor 5, the axis of symmetry (CC') of the ingoing shaft 4 mainly coincides with the geometrical axis of symmetry (BB') of the gear wheel transmission (3) and thus the alignment error (ΔY, ΔQ) between the above mentioned axes of symmetry (BB',CC') in the static, loaded condition is zero.

6. A gearbox according to claim 5, characterized in that the ingoing shaft (4) is bearing-mounted by means of the bearing (7) or the bearings (21, 22) which support the rotor shaft in the housing (20) of the turbine.

7. A gearbox according to claim 6, characterized in that the housing (2) of the gearbox (1) is provided such on
the housing (20) of the wind turbine that the geometrical axis of symmetry (BB') of the gear wheel transmission (3), in the unloaded condition, is eccentric in relation to the axis of symmetry (AA') of the seating (8) or seatings (23,24) of the bearing (7,21,22) of the ingoing shaft (4) in the housing (2,20).

8. A gearbox according to claim 6, characterized in that the seatings (8,23,24) of the above-mentioned bearings (7,21,22) are provided such in the housing (2,20) that they are eccentric in relation to the geometrical axis of symmetry (BB') of the gear wheel transmission (3) in the unloaded condition.

9. A gearbox according to claim 1, characterized in that the gear wheel transmission (3) is a planetary gear wheel transmission.

10. A gearbox according to claim 9, characterized in that the driving gear wheel is the planetary gear (12) of the planetary gear wheel transmission.

11. A gearbox according to claim 9, characterized in that the driving gear wheels are the planet wheels (10) of the planetary gear wheel transmission.

12. A gearbox according to claim 1, characterized in that the gear wheel transmission comprises a driving gear wheel (16) on the ingoing shaft (4) which drives several gear wheels (17) provided in a symmetrical manner round the driving gear wheel (16).

13. A gearbox (1) for a wind turbine, comprising:
a housing (2) with a seating (8); and
a gear wheel transmission (3),
the gear wheel transmission comprising an
i) a driven shaft (6)
ii) an ingoing shaft (4) mountable to a rotor (5) of the wind turbine,
iii) a main bearing (7) supporting the ingoing shaft (4), the main bearing (7) provided in the seating (8) of the housing (2), the main bearing (7) arranged to absorb axial loads and radial loads,
iv) a planet carrier (9) on the ingoing shaft (4),
v) planet wheels (10) rotatable via bearings (11) on the planet carrier (9),
vi) a planetary gear (12) fixed to the housing (2), and
vii) a sun gear (13) rotatable on the driven shaft (6), a geometrical axis of symmetry (BB') of the gear wheel transmission (3) being defined by a geometrical axis of symmetry (BB') of the planetary gear (12) and the sun gear (13) working in conjunction with the planet wheels (10), wherein,
in an unloaded condition, an axis of symmetry (AA') of the seating (8) of the bearing (7) of the ingoing shaft (4) is noncoincident with the geometrical axis of symmetry (BB') of the gear wheel transmission (3), the noncoincidence providing a deviation (ΔX, ΔP) between the axis of symmetry (AA') of the seating (8) and the geometrical axis of symmetry (BB') of the gear wheel transmission (3) where both of the axes of symmetry (AA', BB') are shifted in relation to each other in a cross direction over a distance with the seating (8) of the main bearing (7), in the unloaded condition, eccentric in relation to the geometrical axis of symmetry (BB') of the gear wheel transmission 3, the deviation, in a static, loaded condition under a weight (W) of the rotor (5), providing static compensation for an alignment error caused by the weight (W) of the rotor (5).

14. A gearbox (1) for a wind turbine, comprising:

a housing (2) with a seating (8); and a gear wheel transmission (3), the gear wheel transmission comprising an i) ingoing shaft (4) arranged as a driving shaft mountable to a rotor (5) of the wind turbine, ii) a driven shaft (6), iii) a main bearing (7) supporting the ingoing shaft (4), an inner bearing ring of the main bearing provided in the seating (8) of the housing (2), the main bearing (7) arranged to absorb axial loads and radial loads, iv) a planet carrier (9) on the ingoing shaft (4), v) planet wheels (10) rotatable via bearings (11) on the planet carrier (9), vi) a planetary gear (12) fixed to the housing (2), and vii) a sun gear (13) in the housing and rotatable on the driven shaft (6), whereby the planet wheels (10) work in conjunction with the planetary gear (12) and the sun gear (13), wherein, an axis of symmetry (AA') of the seating (8) of the bearing (7) of the ingoing shaft (4), in an unloaded condition, is noncoincident with a geometrical axis of symmetry (BB') of the gear wheel transmission (3) as defined by a geometrical axis of symmetry (BB') of the planetary gear (12) and the sun gear (13) working in conjunction with the planet wheels (10) with a deviation ($\Delta X$, $\Delta P$) between the axis of symmetry (AA') of the seating (8) and the geometrical axis of symmetry (BB') of the gear wheel transmission (3) whereby the deviation, in a static, loaded condition under a weight (W) of the rotor (5), provides static compensation for an alignment error caused by the weight (W) of the rotor (5).

* * * * *